US009718280B1

(12) United States Patent
Beicht et al.

(10) Patent No.: US 9,718,280 B1
(45) Date of Patent: Aug. 1, 2017

(54) LIBRARY SYSTEM WITH INTEGRATED LABEL PRINTER

(71) Applicant: International Business Machines Corporation, Armonk, NY (US)

(72) Inventors: Bernd Beicht, Budenheim (DE); Marcus Breuer, Dalheim (DE); Frank Krick, Ockenheim (DE); Thorsten Muehge, Budenheim (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/230,567

(22) Filed: Aug. 8, 2016

(51) Int. Cl.
| | |
|---|---|
| *B41J 3/407* | (2006.01) |
| *G11B 15/68* | (2006.01) |
| *G11B 23/40* | (2006.01) |
| *G11B 17/22* | (2006.01) |
| *G11B 33/12* | (2006.01) |

(52) U.S. Cl.
CPC ............ *B41J 3/4075* (2013.01); *G11B 15/68* (2013.01); *G11B 17/22* (2013.01); *G11B 23/40* (2013.01); *G11B 33/12* (2013.01)

(58) Field of Classification Search
CPC ......... G11B 15/68; G11B 13/40; G11B 17/33; G11B 33/12; B41J 3/4075; G03F 3/1296
USPC .......................................................... 369/30
See application file for complete search history.

(56) References Cited

U.S. PATENT DOCUMENTS

| | | | | |
|---|---|---|---|---|
| 5,214,768 | A | * 5/1993 | Martin | .................. G06F 3/0601 369/34.01 |
| 8,262,218 | B2 | * 9/2012 | Choi | ...................... G11B 23/40 347/105 |
| 2004/0141661 | A1 | * 7/2004 | Hanna | .................. G06F 19/321 382/305 |
| 2005/0041091 | A1 | * 2/2005 | Sawyer | .................. B41J 3/4071 347/224 |

(Continued)

FOREIGN PATENT DOCUMENTS

| | | |
|---|---|---|
| GB | 2428864 A | 7/2007 |
| JP | 2007317157 A | 12/2007 |

(Continued)

OTHER PUBLICATIONS

IBM et al., "Apparatus for Labeling Removable Media Cartridges with Bistable LCD", An IP.com Prior Art Database Technical Disclosure, Original Publication Date: Nov. 11, 2008, IP.com No. IPCOM000176254D, IP.com Electronic Publication Date: Nov. 11, 2008, 4 pages.

(Continued)

*Primary Examiner* — Huan Tran
*Assistant Examiner* — Alexander D Shenderov
(74) *Attorney, Agent, or Firm* — Steven F. McDaniel

(57) ABSTRACT

A library system includes a plurality of drive modules for reading and writing storage media, typically magnetic tapes. The library system includes: (i) a picker for loading and unloading cartridges into, and out of, the drive modules; and/or (ii) a label printing drive integrated into the library system. The label printing drive receives a cartridge in the same way any of the drive modules receives a cartridge. The picker loads the cartridge in an identical way as the other drive modules and the label printing drive.

15 Claims, 12 Drawing Sheets

(56) References Cited

U.S. PATENT DOCUMENTS

2012/0243170 A1* 9/2012 Frink .................. G06F 1/187
                                                            361/679.34
2014/0307279 A1    10/2014 Yasui et al.

FOREIGN PATENT DOCUMENTS

| JP | 5605647 B2 | 10/2014 |
| JP | 2015066894 A | 4/2015 |

OTHER PUBLICATIONS

IBM Appendix P, list of patents and patent applications treated as related, Aug. 8, 2016, 2 pages.

* cited by examiner

LIBRARY SYSTEM WITH INTEGRATED LABEL PRINTER

BACKGROUND OF THE INVENTION

The present invention relates generally to a library system comprising a plurality of drive modules and printing labels for cartridges, and more specifically, to a library system comprising an integrated label printer inside the library system instead of a drive module. The invention relates further to a method for integrating a label printing drive into a library system.

Typically, magnetic tapes are used as long-term storage media and/or for data archiving purposes. Magnetic tapes are typically enclosed in standardized cartridges. In order to differentiate the cartridges by optical pattern recognition, printed labels are typically applied to the cartridges. The labels may be human-readable and/or machine-readable. In typical cases, the label contains a volume serial number and a barcode that the library system can read. Typically, various vendors generate these labels, and end-users manually place them on the cartridges. Even if the labels are specified in quality categories, the machine readability and longtime stability of the labels vary from vendor to vendor. Issues with reading a label (and thus, identifying a cartridge) may be time-consuming and can lead to a situation in which data on the magnetic medium may not be available for users. Thereby, business continuity for enterprises may be endangered. This may be especially critical if users have to perform restore operations instead of supporting the continuous operation.

Additionally, the manual replacement of the labels onto the cartridges is not only time-consuming but also error prone. Different users may apply the labels on different cartridges in different ways, which makes machine readability more difficult. Furthermore, labels from different vendors are not standardized, having different material characteristics, such as reflectivity, and durability of the printed code on the label.

SUMMARY

According to one aspect of the present invention, a library system includes a plurality of drive modules for reading and writing storage media. The drive modules may all have an identical form factor. The library system may include a picker for loading and unloading cartridges into and out of the drive modules. The cartridges may include the storage media. The library system may further include a label printing drive integrated into the library system by replacing one of the drive modules from the plurality of drive modules. The label printing drive may be adapted for reception of a cartridge the same way a drive module is adapted for reception of the cartridge. The picker may be adapted for loading the cartridge into the label printing drive in an identical way as the picker loads the cartridge into a drive module.

According to another aspect of the present invention, a method for integrating a label printing drive into a library system includes providing a housing of a tape library system having a backplane with a plurality of identical connectors, and connecting individual ones of a plurality of drive modules to individual ones of the plurality of identical connectors. Additionally, the label printing drive may be connected to one of the plurality of identical connectors. The label printing drive may actually replace one of the drive modules. The method may further include loading a cartridge (including a storage medium) by a picker into the label printing drive, and applying a printed label to the cartridge by the label printing drive, wherein the label has been printed by the label printing drive. Finally, the cartridge may be unloaded from the label printing drive, in particular by the picker.

BRIEF DESCRIPTION OF THE DRAWINGS

It should be noted that embodiments of the invention are described with reference to various subject-matter. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is to be considered as disclosed within this document.

The aspects defined above and further aspects of the present invention are apparent from the examples of embodiments to be described hereinafter and are explained with reference to the examples of embodiments, but to which the invention is not limited.

DETAILED DESCRIPTION

Figure 1:
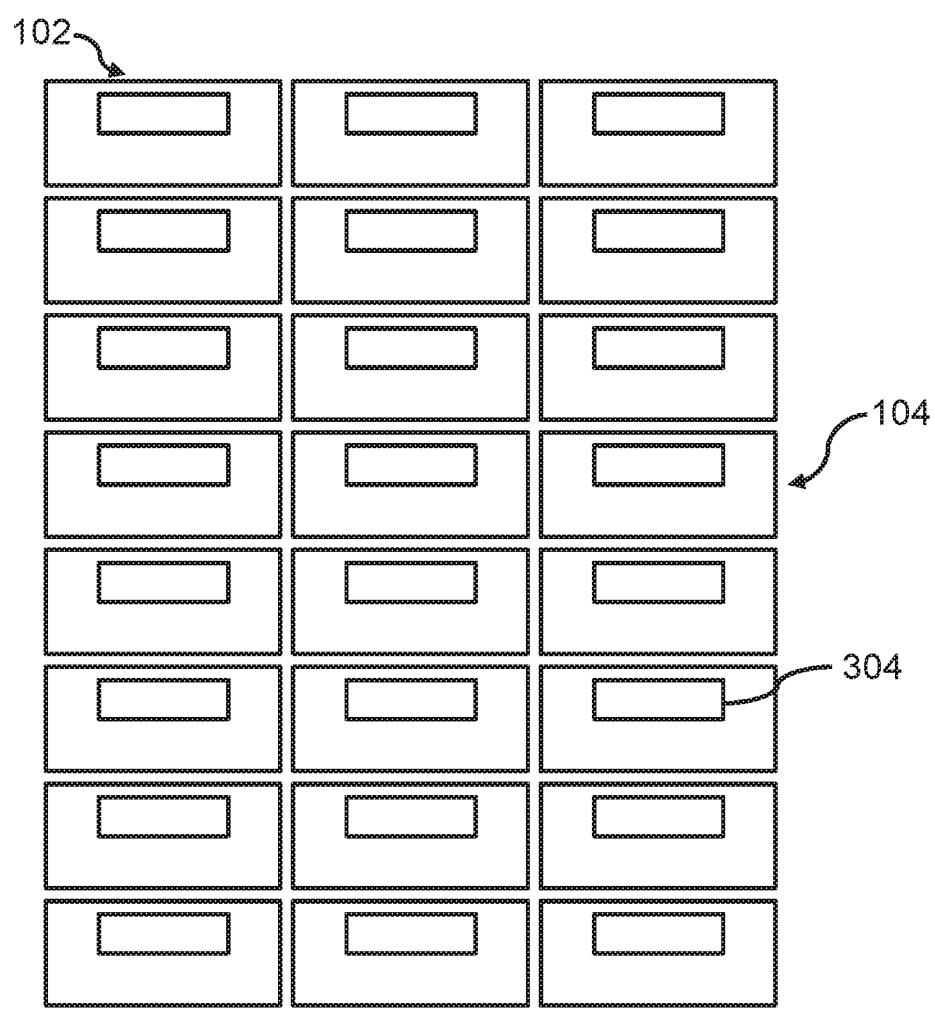
FIG. 1 is a block diagram depicting a library system comprising a plurality of drive modules with a label printing drive, in accordance with at least one embodiment of the present invention.

In the context of this description, the following conventions, terms and/or expressions may be used:

The term 'library system' may denote a system acting as storage system for a large amount of data, often archived data. For this purpose, a plurality of cartridges with storage media inside may be used. A plurality of devices, in particular drive modules, may be used. They may be connected to a backplane of the library system in an identical way. Thus, by adding drive modules, also the number of cartridges being read in parallel may be increased. Additionally, cartridges not inserted into one of the drive modules may be managed by the library system. Typically, the storage medium inside a cartridge is a magnetic tape. However, also other storage media may be used like SSDs (solid state disk), magnetic discs, mini discs and/or optical discs, and the like. It may also be possible to mix different storage media within one library system. If only magnetic tape disks are managed with a library system, it may be denoted as tape library or the tape library system.

The term 'drive modules' may denote a device adapted for reading and writing to one of the storage media.

The term 'form factor' may refer to a device having defined physical and electrical dimensions, connectors, voltage requirements and/or communication protocols.

The term 'picker' may denote a mechanical device adapted for picking a cartridge. The picker may be connected to a robotic arm enabling the picker to reach at least all drive modules within a library system. An alternative name may be the term 'gripper'.

The term 'cartridge' may denote a casing or a storage medium like a magnetic storage tape. The cartridges may be compatible to a certain linear tape standards. Other cartridge forms are possible. However, they should be compatible with the drive modules as well as label printing drive.

The term 'label printing drive' may denote a device adapted for printing labels to be applied to one of the cartridges. In a simple embodiment it may be a printer printing data on labels and applying the labels to the side of the cartridge.

The term 'cartridge load unit' may denote a plurality of mechanical components adapted, combined and operable for receiving a cartridge from a gripper. The cartridge load unit may be positioned inside a drive module or a label printing drive. It may pull the cartridge inside the drive and position it inside the drive to either read and/or write date to it, or, alternatively, apply a label to it.

The term 'tunnel system' may denote a bridging system enabling transport of a cartridge from one library system to another library system. If a label printing drive is positioned inside one of a plurality of library systems, a tunnel system may enable cartridges from a one library system to receive labels from the label printing drive located in a different library system.

The proposed library system comprising a plurality of drive modules for reading and writing storage media may offer multiple advantages and technical effects:

Firstly, into the proposed library system, a label printing drive may be integrated in the same way a normal drive would be integrated. The label printing drive may simply replace a drive module for reading and writing tapes and a cartridge. Because of identical mechanical and electrical connectors—i.e., the same form factor—the cartridge label printer may behave like a standalone drive module. It may communicate using the same network protocol as a drive module of a tape library system. Thus, no modifications may be required to a standard infrastructure component of a library system.

Additionally, the labels may be positioned onto the cartridges in a much more reliable way in terms of orientation and position if compared to manually sticking the labels onto the cartridges by a user. The reliability of the positioning process may be dramatically increased. Always the same quality may be guaranteed which may increase the recognition of the printed information on the label by a human user or by an automatic pattern recognition system. It may be possible to re-label the cartridge if the code on a label fades out or is otherwise not readable in a reliable manner.

It may also be possible to insert unlabeled cartridges into an import/export area—sometimes also called I/O area—of the library system or tape library system, or in any other empty slot of the tape library system. A detector, e.g., in a picker or gripper may recognize that the cartridge may not carry a label and may feed the cartridge into the label printing drive inside the tape library system. No manual handling may be required at all. This may increase the reliability of the library system and reduce operational costs because no operator intervention may be required to equip the cartridges with labels.

Additionally, the label printing drive in one tape library system may also be usable by a second library system if the two library systems may be connected by a path through a mechanism and allow a transfer of a cartridge from one tape library system to another one. This may be achieved by a tunnel system.

A further advantage may lie in the fact that labels applied to a cartridge are not touched by a human hand which may transfer acid or fat from the skin to the label which may have a negative effect on the durability and longevity of the label. Again, the reliability of the total library system may be increased, protecting investments.

It may also be noted that not only one label printing drive may be integrated in the library system but also two or more label printing drives may be possible.

In the following, additional embodiments of the library system and the related method may be described:

According to one embodiment of the library system, the cartridge may be a tape cartridge, and the storage medium may be a magnetic tape. Other options have been mentioned already. In case a magnetic tape is housed by a cartridge, the library system may be a tape library system or, in short, a tape library.

According to one embodiment of the library system, the label printing drive may comprise a label supply roll comprising individual labels on a carrier tape, an empty carrier tape take-up reel, and a label printing device adapted for printing a code on the label. The code may be a barcode, a QR (quick response) code, or any human recognizable code; e.g., alphanumeric characters or any other symbols. The label printing drive may further comprise a carrier tape transport unit, a label removal unit adapted for a removal of a label from the carrier tape, and a label application unit adapted for applying the label to the cartridge. Thus, a complete set of mechanical components may be housed by the label printing drive in order to print labels and apply the labels automatically to a cartridge that has been loaded to the label printing drive.

According to an embodiment of the library system, the label removal unit may comprise a movable, guided label release roller which may be held by a released spring in a parking position. The guided label release roller may be movable parallel to a side of the cartridge while the label supply roll may be blocked, whereby, e.g., a supply of the carrier tape may be blocked. The blocking of the label supply roll may happen under a continuous pull of the empty carrier tape take-up reel such that the label may be released from the carrier tape. Thereby, the spring may increasingly be tensioned. That way, the carrier tape functions as a driving mechanism for moving the guided label release roller from its parking position to an active area in which the label may be peeled-off from the carrier tape due to a comparably small diameter of the label release roller. When portions of the label may be peeled-off, a curve-guided application roller may take over.

Therefore, according to another embodiment of the library system, a curve-guided application roller may be movable on a path, which may, e.g., be initially curved—i.e., in the beginning of the movement of the application roller the path may be curved—such that labels released from the carrier tape may be applied to the side of the cartridge. Therefore, the diameter of the application roller selected such that it touches a side of the cartridge if it may be moved along that side. The peeled-off labels may be positioned between the application roller and the side of the cartridge. Hence, the sticky backside of the label may be applied to the cartridge.

It may be noted that the label release roller and the application roller may use the same guiding path, i.e., the same rail, and have a certain (fixed) distance to each other.

According to another embodiment of the library system, a cartridge load unit of the cartridge label printing drive may be identical to a cartridge load unit of any of the plurality of drive modules. The load unit, which may also serve as unload unit may be taken from a drive module without changes. This may enable the reuse of proven technology and reduce production costs.

According to one embodiment of the library system, electrical connections of the label printing drive may be identical to electrical connections of the drive module. This may apply to power connectors as well as signal connectors of any of the plurality of drive modules. Hence, the label printing drive may have the same form factor as any of the drive modules for compatibility reasons. For the library system no precautions may be required to house a label printing drive among the plurality of the drive modules for reading and writing the tapes in the cartridges. The label printing device may be placed in any slot of the library system normally taken by a drive module.

According to an embodiment of the library system, the label printing drive may comprise a controller compatible with a communication protocol of any of the drive modules. Thus, the label printing drive may easily replace a normal drive module for reading and writing storage media, such as tapes.

According to another embodiment of the library system, the label printing device may be a thermal printer using thermo-sensitive paper, a thermal printer using a thermal ink transfer belt, a laser printer, an inkjet printer, or a printer using an inked ribbon. Hence, any printing technique now known, or that may be developed in the future, may be used. Embodiments of the present invention may be compatible with any type of printing technology.

In an additional optional embodiment, the library system may comprise a detector, e.g., a camera, a scanner or another sensor, for reading the label. The sensor may be integrated into the picker. When a cartridge is unloaded from the label printing drive, the sensor may recognize the code which has just been printed to the label and applied to the cartridge, and send the code to a control unit that may have sent the code to the label printing device. The two codes may be compared. If they are equal, the printing and labeling process was successful. That way, a closed loop quality process may be implemented as part of labeling the cartridge. Such a closed loop quality process may not be implementable using a traditional labeling technology.

According to a preferred embodiment of the method, the loading the cartridge by the picker into the label printing drive may comprise loading the cartridge from one of the drive modules or from a cartridge supply area; and the unloading the cartridge from the label printing drive may comprise loading the cartridge into one of the drive modules or into a slot of a cartridge supply area. The cartridge supply area may be implemented as a plurality of cartridge slots comprising space for cartridge, in particular empty cartridges. It may also be denoted as I/O area or input/output station. Here, spare cartridges may be stored. From this area, cartridges may be loaded or unload into and out of the library system.

According to an embodiment of the method, applying the printed label to the cartridge may also comprise receiving label print data, via one of the identical connectors, by a controller of the label printing drive. The controller may be compatible with a communication protocol of the drive modules, as described earlier. Hence, the label printing drive may be placed anywhere in the library system, replacing a drive module and the prerequisites for the closed loop quality process may be satisfied. Consequently, applying the printed label to the cartridge may comprise printing a code on a label releasable from the carrier tape by the label printing drive before (or after) applying the label to the cartridge.

According to one embodiment of the method, loading a cartridge, comprising a storage medium, by a picker into the label printing drive may comprise transporting the cartridge from another library system via a tunnel system to the label printing device. The tunnel system may be configured for transporting cartridges from one library system to another one. Thus, clustered library systems may use one common (or shared) label printing drive instead of providing a label printing device for every library system.

Detailed Description of Example Embodiments

In the following, a detailed description of the figures will be given. All depictions in the figures are schematic. Firstly, an embodiment of the inventive library system comprising a plurality of drive modules for reading and writing storage media together with a label printing drive is given. Afterwards, further embodiments, as well an embodiment of the method for integrating a label printing drive into a library system, will be described.

FIG. 1 shows a block diagram of an embodiment of a plurality of drive modules 102 in which one of the drive modules 102 has been replaced by a label printing drive 104. From the front side—as shown—there is basically no difference between the drive module 102 and the label printing drive 104. Both devices comprise the same front slot 304 to load a cartridge. The plurality of drive modules 102 including the label printing drive 104 may be integrated into a library system of which details are not shown.

Figure 2:
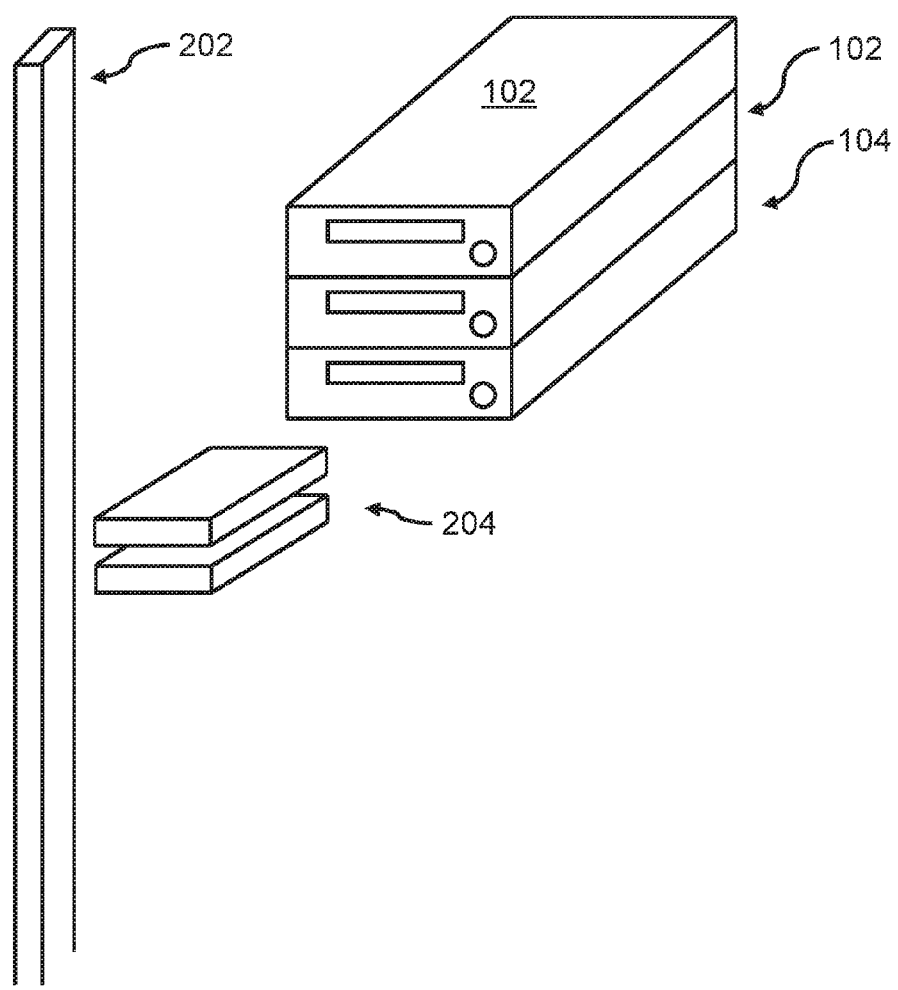
FIG. 2 is a perspective view of two drive modules and a label printing drive, two cartridges and a bar of a tape robot, in accordance with at least one embodiment of the present invention.

FIG. 2 shows a more detailed view of a part of the plurality of drive modules 102. The top two boxes of the stack of devices on the right side of FIG. 2 are drive modules 102, whereas the bottom device represents a label printing drive 104. Additionally, a vertical bar 202 is shown on which a gripper (not shown for simplicity reasons) may be moved up and down in order to load or unload one or more cartridges 204 into one or more of the modules or drives. The vertical bar 202 and the gripper may be part of a cartridge or tape robot. As can be seen, from the front and side of the outside of the devices, a drive module 102 and a label printing device cannot be differentiated.

Figure 3:
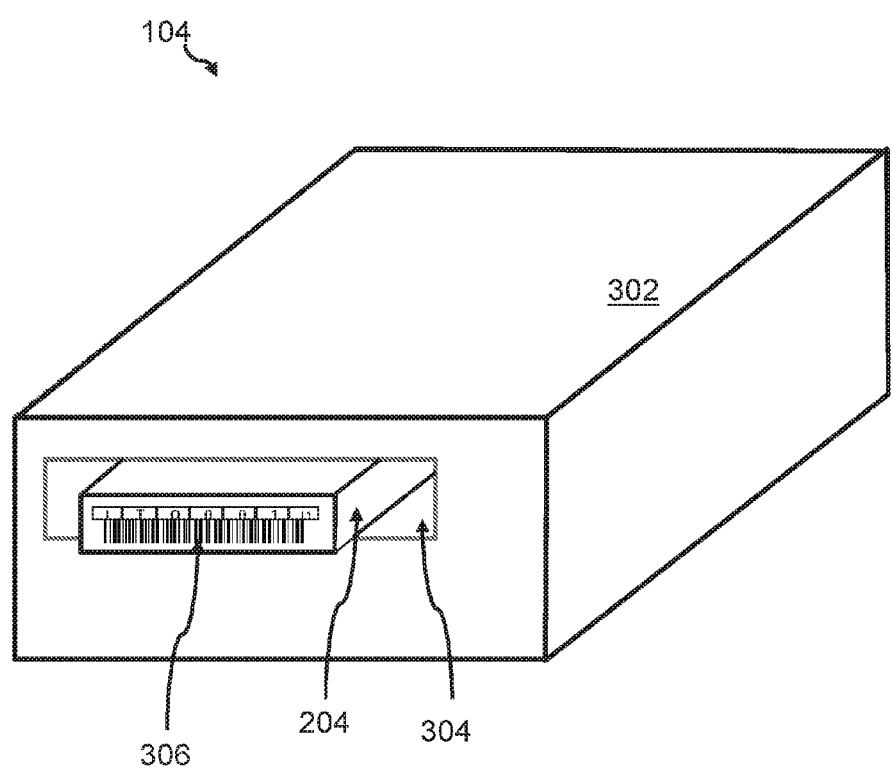
FIG. 3 is a perspective view of a label printing device with a cartridge, in accordance with at least one embodiment of the present invention.

FIG. 3 shows a block diagram of an embodiment of a cartridge label printer 104. It has a housing 302 like any normal drive module, i.e., a shape and physical dimensions, like a normal drive module of a tape library system. Additionally, it comprises slot 304 for receiving cartridge 204. Behind the slot 304, the cartridge load unit with identical functions if compared to the drive module 102 may receive the cartridge 204 to be labeled. The cartridge load unit may also function as an unload unit once a label 306 may have been supplied to the cartridge 204. The label 306 may be directed to the front of the cartridge 204, so that a recognition system of a gripper of a tape robot is enabled to read the code printed on the label 302.

Figure 4:
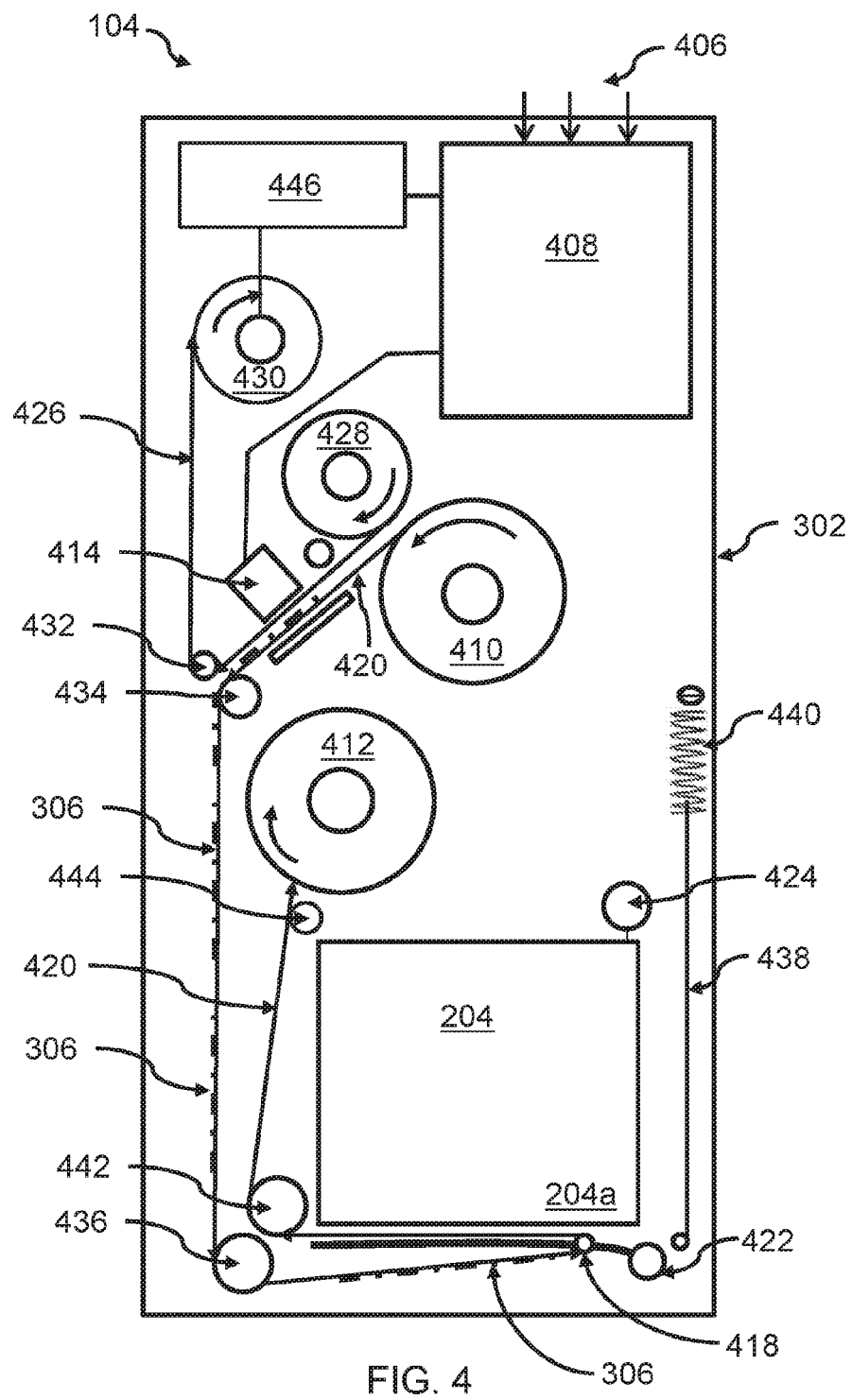
FIG. 4 is a first view of a label printing drive, in accordance with at least one embodiment of the present invention.

FIG. 4 shows a block diagram of an embodiment of the cartridge label printer 104 for printing and applying a label to a cartridge 204 comprising a storage medium. The storage medium may, e.g., be a magnetic tape. The cartridge label printer 104 comprises a housing 302 having a form factor and electrical connectors 406 identical to a drive module of a library system. The drive module may typically be used for reading and writing magnetic tapes and they may typically be used by a tape library system as known in the art. The electrical connectors 406 may typically be used for a data interface—e.g., a network interface and/or library system interface—as well as for power supply.

The cartridge label printer 104 may additionally comprise a controller 408 with controlling functions for the cartridge label printer. Input signals of the controller 408 may be compatible with a communication protocol of the drive module. A cartridge load unit (not shown) may also have identical functions if compared to the drive module. Thus, the mechanics of the cartridge load unit of the drive module may also be used for the cartridge label printer 104. This way, the controlling functions of the controller 408 for moving the cartridge 204 into a secured position within the cartridge label printer 104 may be reused from a drive module. A motor 424 may be instrumental in achieving a movement in a z-direction if the plane of FIG. 4 is assumed to be in the x- and y-direction.

The cartridge label printer 104 may also comprise a label supply roll 410 comprising individual labels on a carrier tape, an empty carrier tape take-up reel 412, as well as a label printing device adapted for printing a code on the label 416. This may be print head of a typical printer as already mentioned above. Furthermore, the cartridge label printer 104 comprises a carrier tape transport unit—in particular the sum of all rollers guiders and motors required to turn the rolls, in particular the empty carrier tape take-up reel and/or the label supply roll and/or brake or blocking systems. Additionally, rolls or wheels for a transfer ribbon and related motors may be denoted as carrier tape transport unit.

The cartridge label printer 104 may also comprise a label removal unit 418—also denoted as guided label release roller 418—adapted for a removal of a label 416 from the carrier tape 420, and a label application unit in form of a curve-guided application roller 422 adapted for applying the label 416 to the cartridge 204.

Furthermore, FIG. 4 shows a thermal ink carrier tape 426 and a related supply wheel 428, a roller 432 and empty carrier tape wheel 430. However, other printing technologies may be used to print labels 416 onto the carrier tape 420. The thermal ink carrier tape 426 may be driven by synchronized stepper motors (not shown) below the supply wheel 428 or supply roll and the empty carrier tape wheel 430 or empty carrier tape roll. The transportation of the thermal ink carrier tape 426 is synchronized with the printing of codes—e.g., in the form of barcodes—to the labels 416 by the printer head 414.

In operation, the labels 306 are supplied from the label supply roll 410, are guided in front of the printer head 414 and guided via rollers 434 and 436 to the front of the cartridge 204. The next roller, namely, the guided label release roller 418, which is mounted onto a sliding curved guide 136, has the first function to release the printed label 416 by bending the carrier tape 420 with the label over a small radius roller, namely the guided label release roller 418 that it releases the label from the carrier trade while moving. The guided label release roller 418 and the curve-guided label application roller 422 may be forced back to the shown position—in particular a parking position—by a flexible steel wire 438 and a spring 440 used to provide constant tension to the sliding rollers. The empty carrier tape 204a is over the rollers 442 and 444 and wound up by using the empty carrier tape take-up reel 412. Typically, the wheels and rolls and are driven by stepper motors.

The process of labeling a cartridge 204 starts with loading the cartridge into a slot in the housing of the cartridge label printer 104. Once the cartridge 204 has been received, a confirmation message is generated to signal that a cartridge 204 is seated into the load position and ready for receiving a label 416.

In parallel, label information may be requested via the connectors 406—from, e.g., a tape library system—and the controller 408. By default, a next consecutive label value may be used. Alternatively, a dedicated single label value or a list of label values may be received to be sequentially applied via the interface connectors 406, in particular, a network interface. Again alternatively, a third option is to receive a single label value or list of label values to be sequentially applied from an operator panel—e.g., an operator panel of a tape library system—or a library web interface.

In a next step, the printer had 414 is instructed to print the received label value to a label 416. For this purpose, the controller moves an empty label from the label supply roll 410 using a stepper motor driving the label supply roll 410, wherein the stepper motor is synchronously aligned with the motor driving the empty carrier tape take-up reel 412. This may allow a precise positioning of the label for printing, transporting, and applying the label 416 to the cartridge 204. Because the label supply roll 410 and the empty carrier tape take-up reel 412 are moved synchronously—also reflecting a film carrier tape level of the label supply roll 410 and the empty carrier tape take-up reel 412—the force of the spring 414 holds the guided label release roller 118 and the label application roller 422 in the respective parking position in the lower edge 204a of the cartridge 204. This way, a new printed label 416 may be positioned exactly in front of the cartridge 204 to which it may be applied.

Figure 5:
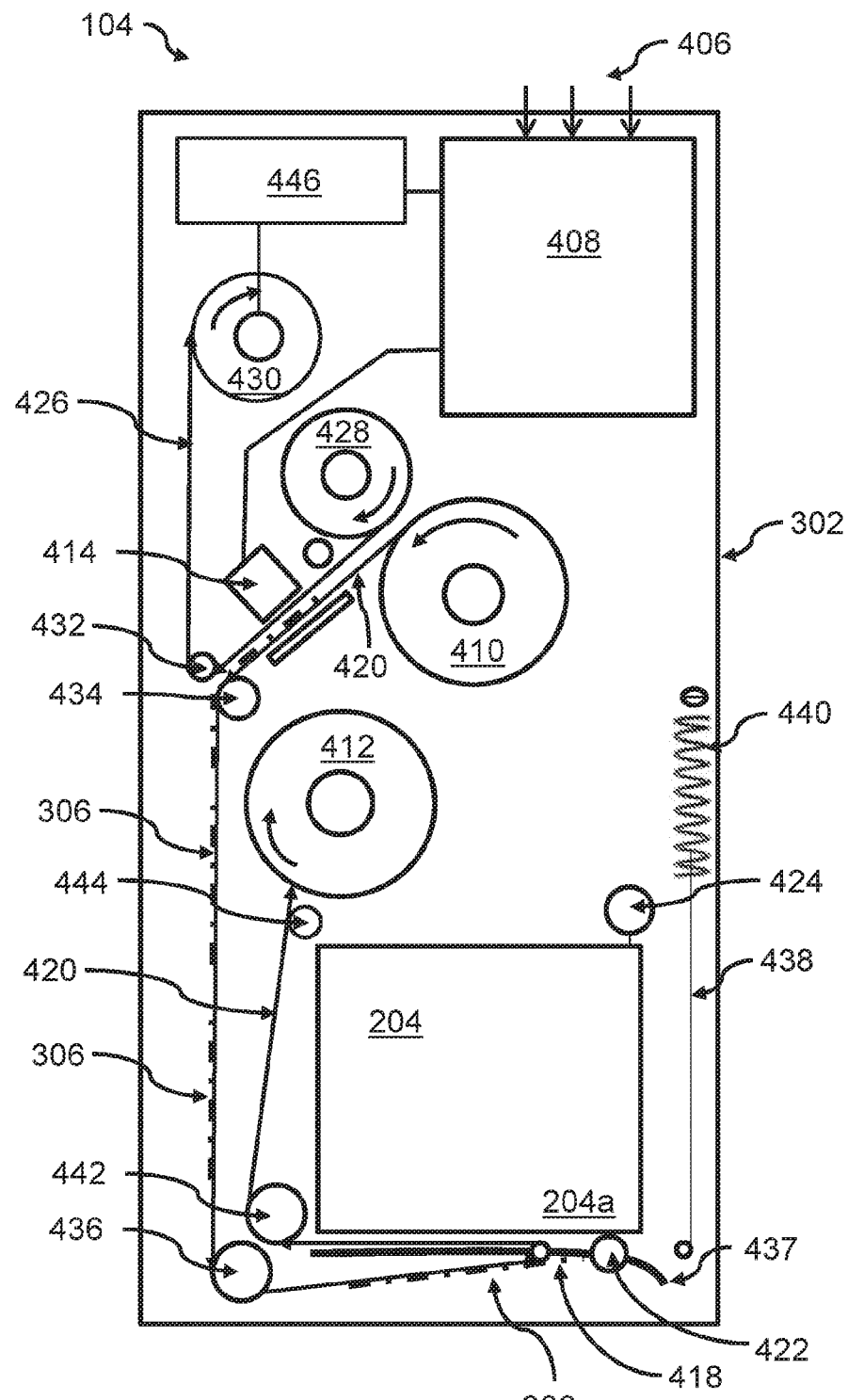
FIG. 5 is a second view of a label printing drive, in accordance with at least one embodiment of the present invention.

FIG. 5 shows a block diagram of an embodiment of the cartridge label printer 104 when the label application is starting. If the printed label 416 is in the application position, the label application cycle starts by stopping (blocking) the label supply roll 410, while at the same time the empty carrier tape take-up reel 412 continues to wind up the carrier tape 420. The printer and motor controller 446 is generating the required signals for all the stepper motors as well as the printer head 414. The print and motor controller 446 is linked to the controller 408. This way, the carrier tape 420 is pulled and forces the label release roller 418 and the label application roller 422 moving more and more parallel to the side of the cartridge 204 facing the carrier tape 420. The label release roller 418 and the label application roller 422 are guided by the curved slider 437. With this, the extension of spring 440—via the wire 438—provides an increasing pullback force to the sliding mechanism of the two rollers 418 and 422. By this movement the label 416 at the bottom of FIG. 4 releases or peels off from the carrier tape 420, while the label application roller 422 follows the slider 436.

By this movement, the label application roller 422 is pressed towards the released label 416, such that the sticky back side of the label 306 is applied to the cartridge 204.

Figure 6:
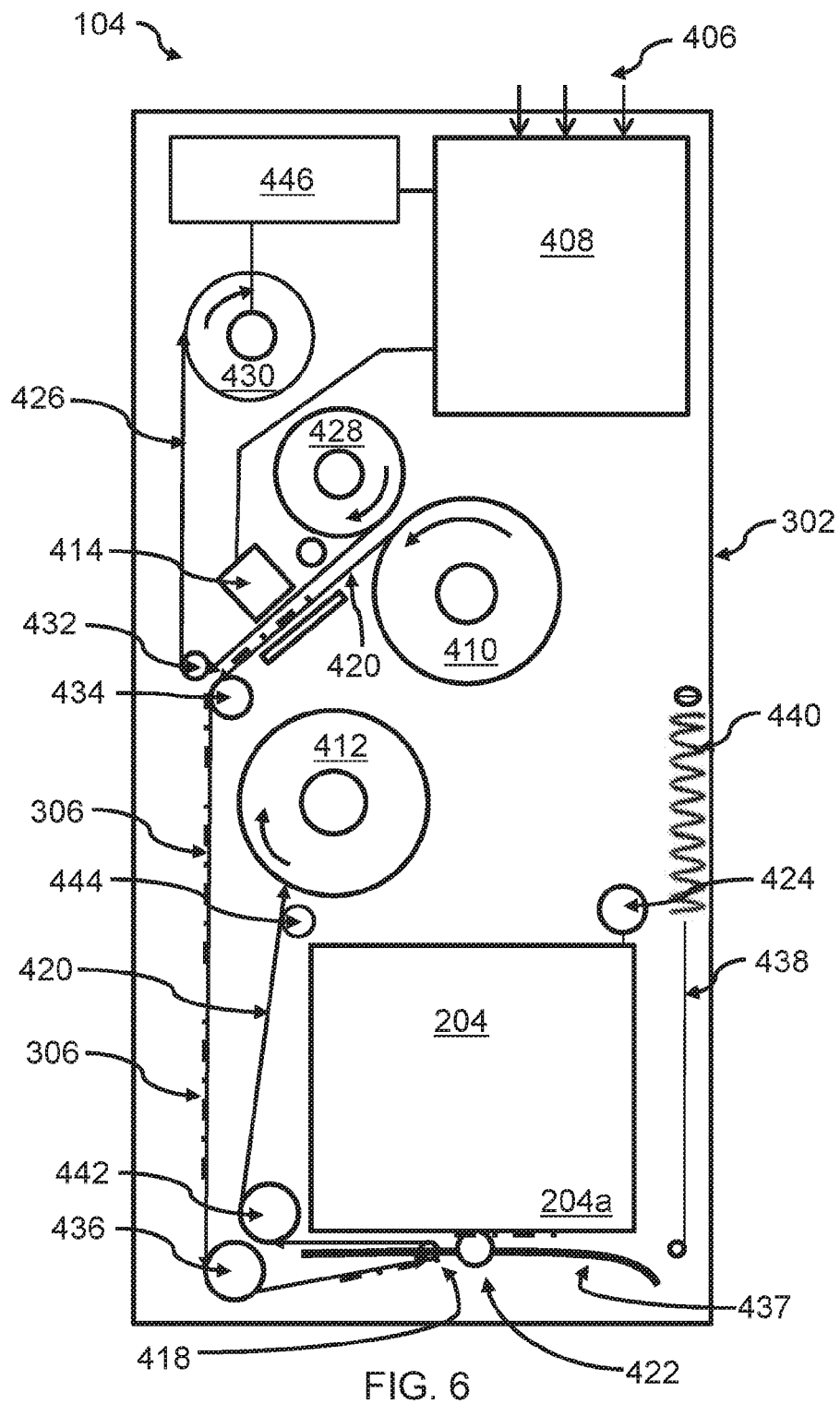
FIG. 6 is a third view of a label printing drive, in accordance with at least one embodiment of the present invention.
Figure 7:
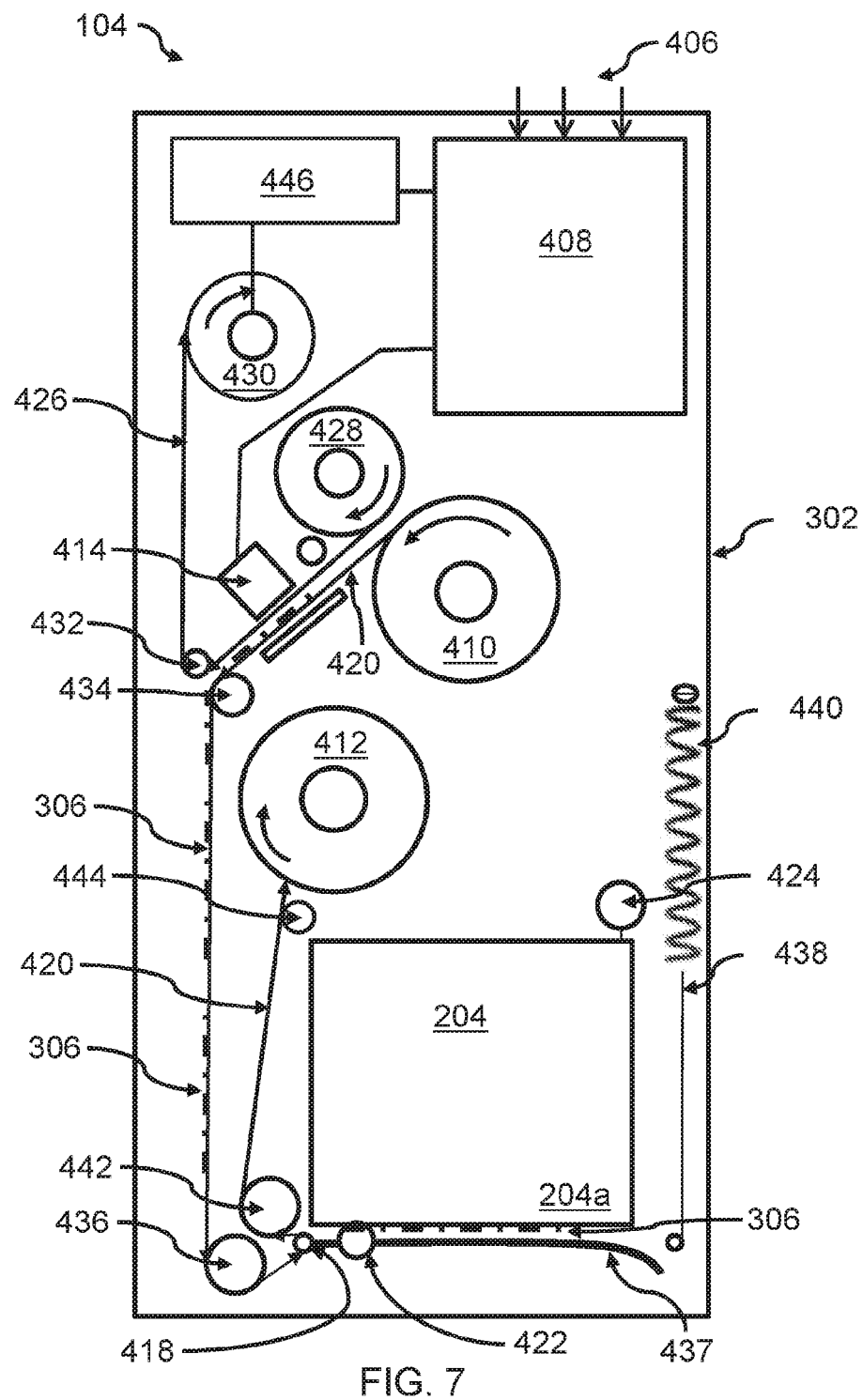
FIG. 7 is a fourth view of a label printing drive, in accordance with at least one embodiment of the present invention.

FIG. 6 shows a block diagram of an embodiment of the cartridge label printer 104 when the label application ends. At this point in time, the label application roller 422 has reached the end of the label 416. Then, a repositioning of the label release roller 418 and the label application roller 422 starts to bring the two rollers back into their parking position on the bottom left side of the figure (see FIG. 7). This is achieved by stopping the pulling of the empty carrier tape take-up reel 412 and reversing its turning direction by the related stepper motor. Due to the force of the spring 414 acting on the label release roller 418 and the label application roller 422, the rollers are pulled back into their related parking positions close to the corner 204a of the cartridge 204.

As a result, the label 416 has been applied to the cartridge 204 and the cartridge 204 may be unloaded from the cartridge label printer 104 using the motor 424.

Figure 8:
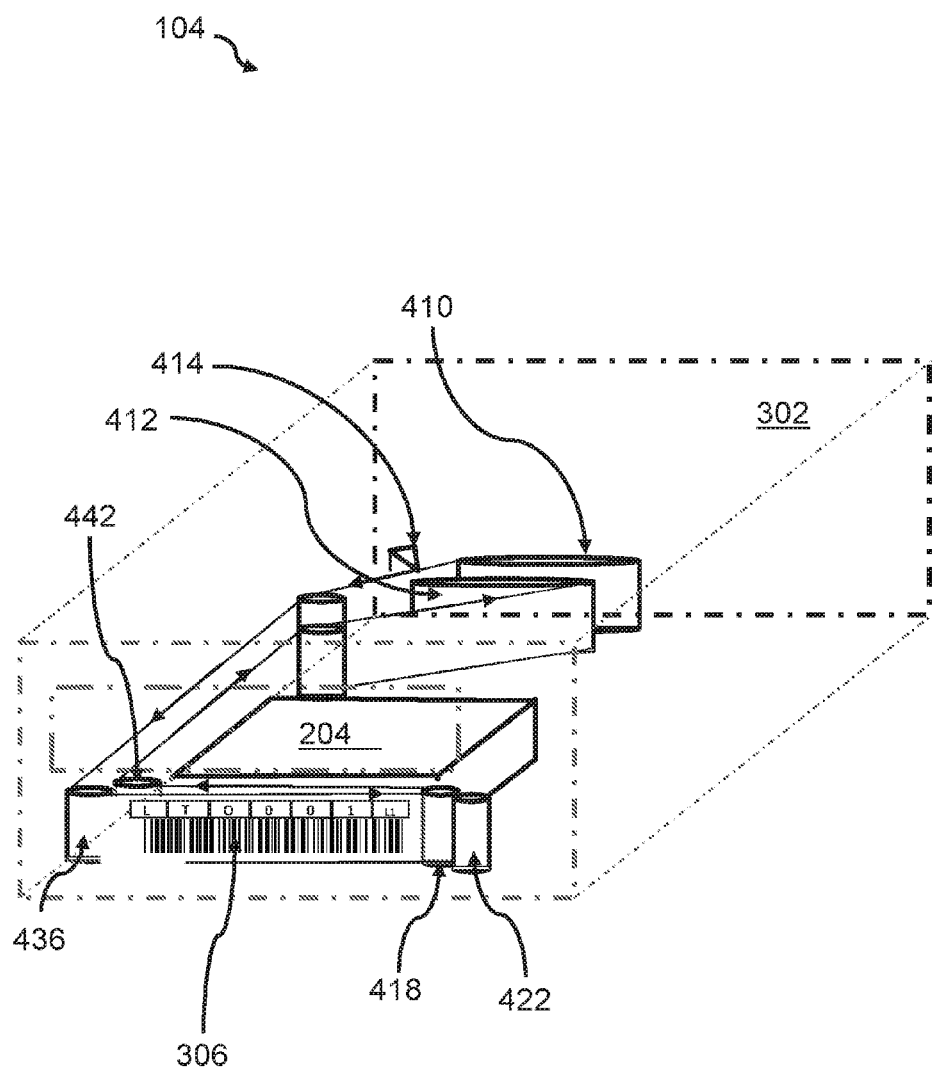
FIG. 8 is a transparent view of a label printing drive with some details, in accordance with at least one embodiment of the present invention.

FIG. 8 shows a three dimensional transparent view of the cartridge label printer. The cartridge 204 has been loaded into an active printing position for applying the label 306 to the cartridge 204. The guided label release roller 418 as well as the curve-guided application roller 422 are shown in the bottom right corner of FIG. 8 The housing 302 is shown having a semitransparent appearance. The guiding roller 436 guiding the carrier tape with the label 306 to the applying position is shown as well as the roller 442 guiding the carrier label to the empty carrier tape take-up reel 412. Also the print head 414 as well as the label supply roll 410 are shown.

Figure 9:
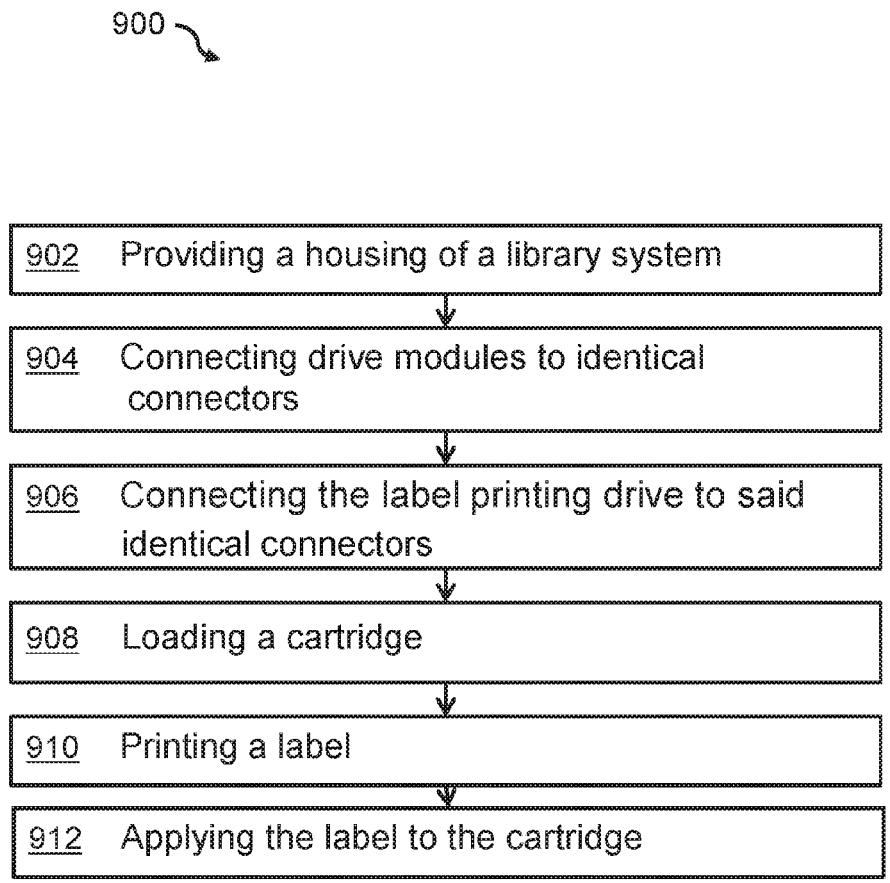
FIG. 9 is a flow chart depicting a method for integrating a label printing drive into a library system, in accordance with at least one embodiment of the present invention.

FIG. 9 shows method 900 for integrating a label printing drive into a library system. The method may comprise providing, 902, a housing of a library system having a backplane with a plurality of identical connectors, connecting, 904, individual drive modules of a plurality of drive modules to individual identical connectors of the plurality of identical connectors, and connecting, 906, the label printing drive to a connector of the plurality of identical connectors. Additionally, the method comprises loading, 908, a cartridge, comprising a storage medium, by a picker into the label printing drive, applying, 912 a printed label to the cartridge by the label printing drive, wherein the label has been printed, 910, by the label printing drive, and unloading the cartridge from the label printing drive.

Figure 10:
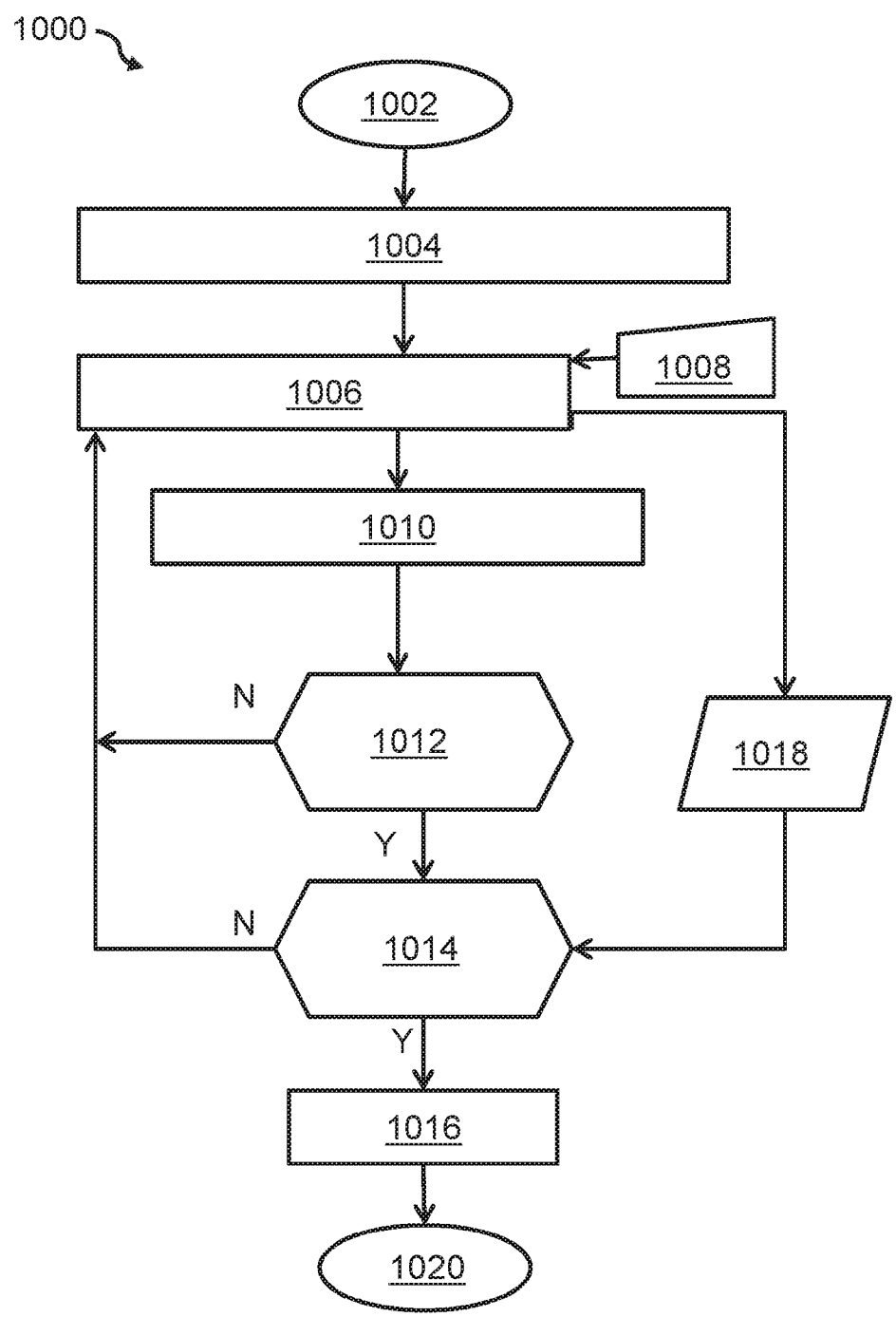
FIG. 10 is a flowchart depicting a method for printing a new label, in accordance with at least one embodiment of the present invention.

FIG. 10 shows a flowchart of an embodiment method 1000 for printing new label in the library system. The process may start at 1002. At 1004, an operator may equip the library system with a new tape cartridge in an empty specified slot. In step 1006, the following actions take place: (i) new label information may be received from a source 1008 (the data may come from an automatic data feed or by manual input by an operator; (ii) the new tape cartridge may be mounted into the label printing drive; (iii) it may be checked whether the user defined label is valid in the specified library; (iv) the printing process takes place; (v) the label cartridge is removed from the label printing drive; and (vi) a transfer file is generated for a verification of the label, which is also claimed (recorded) into the inventory of the library system.

In step 1010, the library system mounts the newly labeled cartridge and checks the readability of the label, 1012. If the label is not readable, the process returns back to 1006. If the label is readable, the expected label is verified, 1014 against the transferred file 1018, generated in step 1006. If the verification is positive, the newly labeled cartridge is claimed to the library inventory, 1016. The process ends at 1020.

An additional process may be derived from this labeling process 1000. If a label on a cartridge is longer be readable, the library system may create an error code based on sensor data of the gripper. Instead of the manual process step 1004, the library system creates the error code and moves the cartridge in and to the label printing drive with the help of the cartridge robot. The remaining part of process 1000 remains unchanged.

Figure 11:
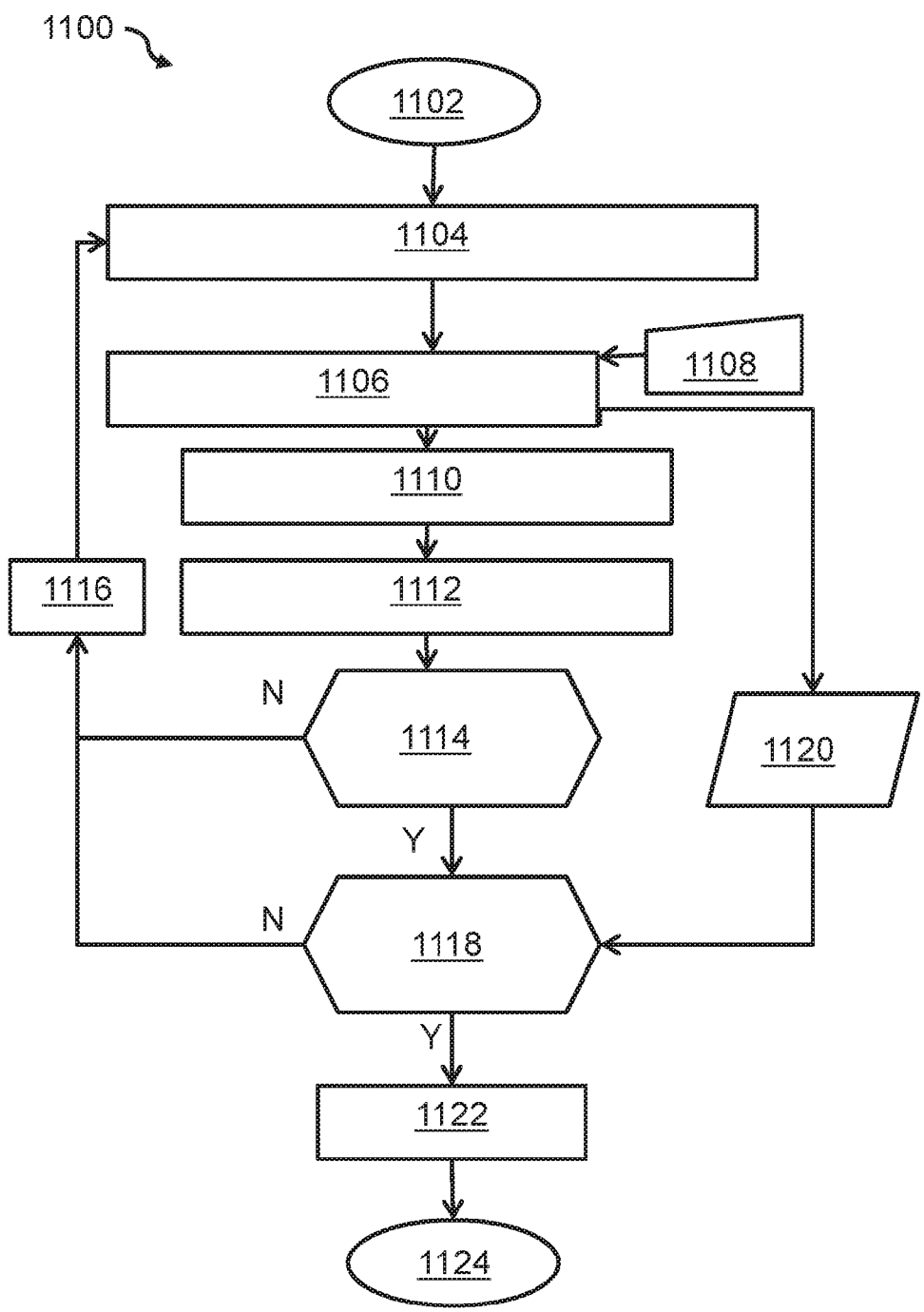
FIG. 11 is a flowchart depicting a method for labeling or relabeling a cartridge from a library which has no label printing drive, in accordance with at least one embodiment of the present invention.

FIG. 11 shows an embodiment of a flowchart of a method 1100 if the cartridge needs to be labeled or re-labeled for a library which has no label printing drive itself. The process starts at 1102. Firstly, 1104, the operator equips the library system with a new tape cartridge in an empty specified slot. The new cartridge is mounted into the label printing drive 1106, and new label information may be received from a source 1108. The printing is started and the newly labeled cartridge is removed again from the label printing drive. Additionally, a transfer file 1120 for verification of the label and a claiming into the inventory of the destination library is generated. The cartridge is moved, 1110, to the destination library, in particular, by a mechanical tunnel or pass through system. The destination library mounts the newly labeled cartridge, 1112, into one of the drive modules. It is checked, 1114, whether the label is readable. If not, then the cartridge is moved back, 1116, and the process starts new with operation 1104.

If the label is readable, the content of the transfer file 1120 is read and checked, 1118, against the read content of the newly applied label and whether the label is valid for the destination library. If that is not the case, the cartridge is moved back, 1116 to operation 1104 of the process. If the verification has a positive result, the cartridge is claimed, 1122, to the library inventory of the destination library system. The process ends at 1124.

Figure 12:
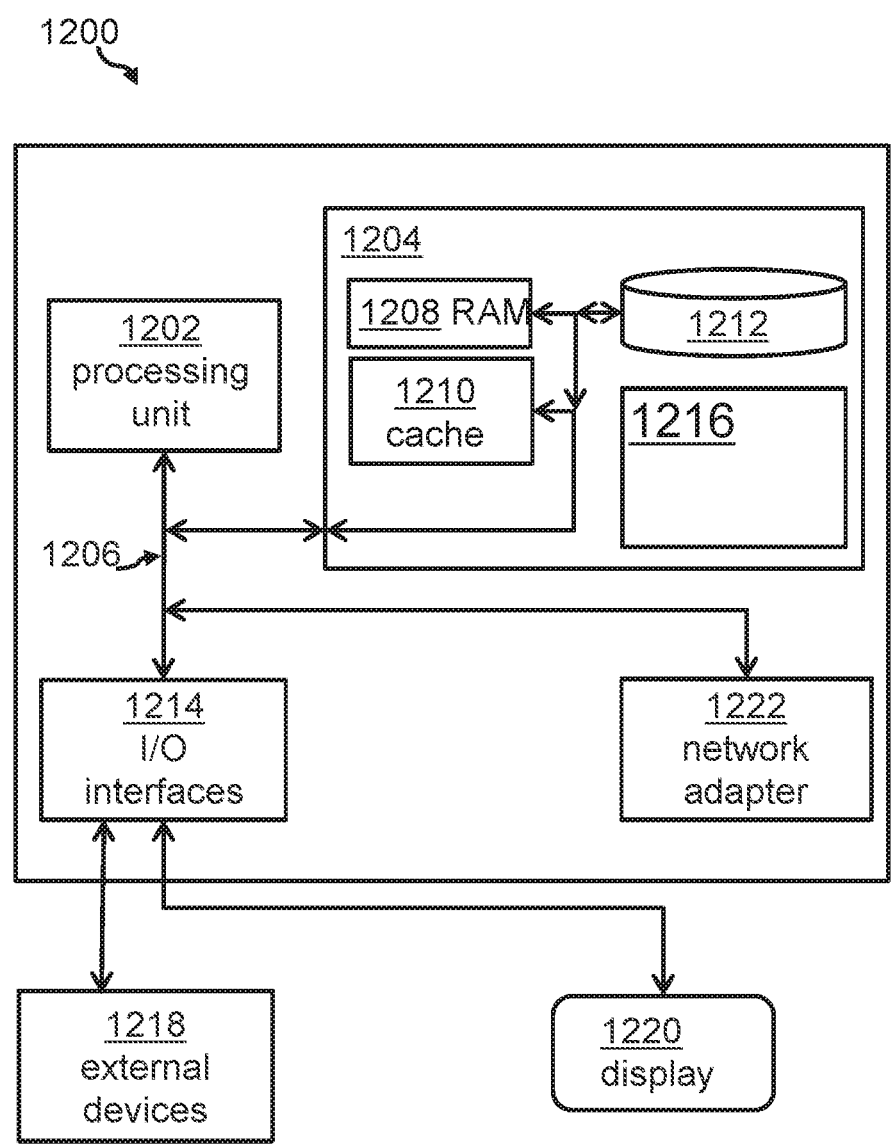
FIG. 12 is a block diagram depicting components of a computer, in accordance with at least one embodiment of the present invention.

Embodiments of the invention may be implemented together with virtually any type of computer, regardless of the platform being suitable for storing and/or executing program code. A computer for supporting the tape library system may be part of the tape library system. FIG. 12 shows, as an example, such a computing system 1200.

The computing system 1200 is only one example of a suitable computer system and is not intended to suggest any limitation as to the scope of use or functionality of embodiments of the invention described herein. Regardless, computer system 1200 is capable of being implemented and/or performing any of the functionality set forth hereinabove. In the computer system 1200, there are components, which are operational with numerous other general purpose or special purpose computing system environments or configurations. Examples of well-known computing systems, environments, and/or configurations that may be suitable for use with computer system/server 1200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1200 may be described in the general context of computer system-executable instructions, such as program modules, being executed by a computer system 1200. Generally, program modules may include routines, programs, objects, components, logic, data structures, and so on that perform particular tasks or implement particular abstract data types. Computer system/server 1200 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1200 is shown in the form of a general-purpose computing device. The components of computer system/server 1200 may include, but are not limited to, one or more processors or processing units 1202, a system memory 804, and a bus 806 that couples various system components including system memory 1204 to the processor 1202. Bus 1206 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1200 typically includes a variety of computer system readable media. Such media may be any available media that is accessible by computer system/server 1200, and it includes both, volatile and non-volatile media, removable and non-removable media.

The system memory 1204 may include computer system readable media in the form of volatile memory, such as random access memory (RAM) 1208 and/or cache memory 1210. Computer system/server 1200 may further include other removable/non-removable, volatile/non-volatile computer system storage media. By way of example only, storage system 1212 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1206 by one or more data media interfaces. As will be further depicted and described below, memory 1204 may include at least one program product having a set (e.g., at least one) of program modules that are configured to carry out the functions of embodiments of the invention.

Program/utility 1214, having a set (at least one) of program modules 1216, may be stored in memory 1204 by way of example, and not limitation, as well as an operating system, one or more application programs, other program modules, and program data. Each of the operating system, one or more application programs, other program modules, and program data or some combination thereof, may include an implementation of a networking environment. Program modules 1216 generally carry out the functions and/or methodologies of embodiments of the invention as described herein.

The computer system/server 1200 may also communicate with one or more external devices 1218 such as a keyboard, a pointing device, a display 1220, etc.; one or more devices that enable a user to interact with computer system/server 1200; and/or any devices (e.g., network card, modem, etc.) that enable computer system/server 1200 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 1222. As depicted, network adapter 1222 may communicate with the other components of computer system/server 1200 via bus 1206. It should be understood that although not shown, other hardware and/or software components could be used in conjunction with computer system/server 1200. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:
1. A library system comprising:
 a plurality of drive modules for reading and writing storage media, each drive module of the plurality of drive modules having an identical form factor;
 a picker for loading and unloading cartridges, comprising a storage medium, into and out of the drive modules of the plurality of drive modules; and a label printing drive integrated into the library system by replacing one of the drive modules of the plurality of drive modules with the label printing drive; wherein:

the label printing drive is adapted for reception of a cartridge in the same manner as each drive module of the plurality of drive modules are adapted for reception of the cartridge, and the picker is adapted for loading the cartridge into the label printing drive in an identical way as the picker loads the cartridge into a drive module of the plurality of drive modules.

2. The library system according to claim 1, wherein:
the cartridges are tape cartridges; and
the storage medium is a magnetic tape.

3. The library system according to claim 1, wherein the label printing drive comprises:
a label supply roll comprising individual labels on a carrier tape;
an empty carrier tape take-up reel;
a label printing device adapted for printing a code on the label;
a carrier tape transport unit;
a label removal unit adapted for a removal of a label from the carrier tape; and
a label application unit adapted for applying the label to the cartridge.

4. The library system according to claim 3, wherein:
the label removal unit comprises a movable, guided label release roller which is held, by a released spring, in a parking position; and
the guided label release roller is movable parallel to a side of the cartridge while the label supply roll is blocked under a continuous pull of the empty carrier tape take-up reel such that the label is released from the carrier tape, whereby the spring is increasingly tensioned.

5. The library system according to claim 4, wherein a curve-guided application roller is movable on a curved path such that released portions from the carrier tape are applied to the side of the cartridge.

6. The library system according to claim 1, wherein a cartridge load unit of the label printing drive is identical to a cartridge load unit of a drive module of the plurality of drive modules.

7. The library system according to claim 1, wherein electrical connections of the label printing drive are identical to electrical connections of a drive module of the plurality of drive modules.

8. The library system according to claim 1, wherein the label printing drive comprises a controller compatible with a communication protocol of a drive module of the plurality of drive modules.

9. The library system according to claim 1, wherein the label printing drive is of a type selected from the group consisting of:
a thermal printer using thermo-sensitive paper;
a thermal printer using a thermal ink transfer belt
a laser printer;
an inkjet printer; and
a printer using an inked ribbon.

10. The library system according to claim 1, further comprising a detector for reading a label.

11. A method for integrating a label printing drive into a first library system, the method comprising:
providing a housing of a tape library system having a backplane with a plurality of identical connectors;
connecting individual drive modules of a plurality of drive modules to individual connectors of the plurality of identical connectors;
connecting the label printing drive to a connector of the plurality of identical connectors;
loading a cartridge comprising a storage medium, by a picker, into the label printing drive;
printing a code on a label by the label printing drive to produce a printed label;
applying the printed label to the cartridge, by the label printing drive; and
unloading the cartridge from the label printing drive.

12. The method according to claim 11, wherein:
loading the cartridge, by the picker, into the label printing drive, comprises loading the cartridge from a drive module of the plurality of drive modules, or from a cartridge supply area; and
unloading the cartridge from the label printing drive comprises loading the cartridge into a drive module of the plurality of the drive modules, or into the cartridge supply area.

13. The method according to claim 11, wherein applying the printed label to the cartridge comprises:
receiving label print data via a connector of the plurality of identical connectors, by a controller of the label printing drive;
wherein the controller is compatible with a communication protocol of the plurality of drive modules.

14. The method according to claim 11, wherein the label is releasable from a carrier tape, by the label printing drive.

15. The method according to claim 11, wherein loading the cartridge into the label printing drive comprises transporting the cartridge from another library system via a tunnel system to the label printing drive.

* * * * *